Dec. 13, 1966   E. C. MATHEWS   3,291,605
PHOTOGRAPHIC METHOD OF PLACING INDICIA
ON A CYLINDRICAL TRANSPARENT SLEEVE
Filed Sept. 13, 1965   2 Sheets-Sheet 1

INVENTOR
EDWARD C. MATHEWS
BY Elwin E. Greigg
ATTORNEY

Dec. 13, 1966

E. C. MATHEWS 3,291,605

PHOTOGRAPHIC METHOD OF PLACING INDICIA
ON A CYLINDRICAL TRANSPARENT SLEEVE

Filed Sept. 13, 1965

INVENTOR
EDWARD C. MATHEWS
BY *[signature]*
ATTORNEY

United States Patent Office 3,291,605
Patented Dec. 13, 1966

3,291,605
PHOTOGRAPHIC METHOD OF PLACING INDICIA ON A CYLINDRICAL TRANSPARENT SLEEVE
Edward C. Mathews, Yorktown Heights, N.Y., assignor to Simmonds Precision Products, Inc., Tarrytown, N.Y., a corporation of New York
Filed Sept. 13, 1965, Ser. No. 491,488
1 Claim. (Cl. 96—38.3)

This application is a continuation-in-part of the application of Edward C. Mathews, Serial No. 154,310, filed November 22, 1961 and was derived from the now issued Mathews Patent No. 3,040,458, granted June 26, 1962, all inventions being owned by a common assignee.

This invention relates to improvements in a novel method of photographically applying indicia to sleeves or strips of transparent material which are subsequently arranged to encompass counter-wheels and thereafter appropriately indirectly lighted for viewing purposes, as well as the article resulting from this method.

The theory of light "piping" through a highly refractive medium or sleeve by virtue of total internal reflection of light rays, making greater than a critical angle of incidence with the walls of the medium, is well-known in the art. However, up to the present time this method has had the inherent disadvantage that it is impossible for such light to enter the medium through one of the surfaces by which light is internally reflected. Heretofore, such devices have always had the light introduced through an edge of some auxiliary surface other than those which confine the light. In the instance of a counter-wheel that is enveloped by a light "piping" medium, it is not possible to introduce the light through an edge thereof. This is particularly true where a series of such counters are arranged for rotation about a central axis.

The method utilized in the practice of this invention for transferring indicia to the inner surface of a transparent annulus involves a process wherein a master layout is photographed by arranging the film with its backing toward the lens with the emulsion positioned adjacent to the lay-out.

Therefore, in its broadest aspects the primary object of the present invention is to provide the method heretofore explained to produce an article which is covered in the patent hereinbefore mentioned wherein light enters the outer wall of a transparent medium in such a way that it makes almost critical angles of incidence with the wall of a sleeve on internal reflection.

Another object of the invention is the complete elimination of bright spots which normally occur in the presently used devices due to the placement of the light source.

A still further object of the invention is to provide an arrangement readily adaptable to the periphery of the standard-type counter with only a very slight modification being necessary.

Still another object of the invention is to provide a lighted counter which gives substantially uniform illumination as well as high contrast between the numerals and the means upon which it is supported.

The details of the invention, as well as additional objects and advantages, will be clearly understood with reference to the embodiment illustrated in the accompanying drawings employing similar reference numerals to identify the same elements in each of the similar views, and in which.

Figures 1, 5, 6:
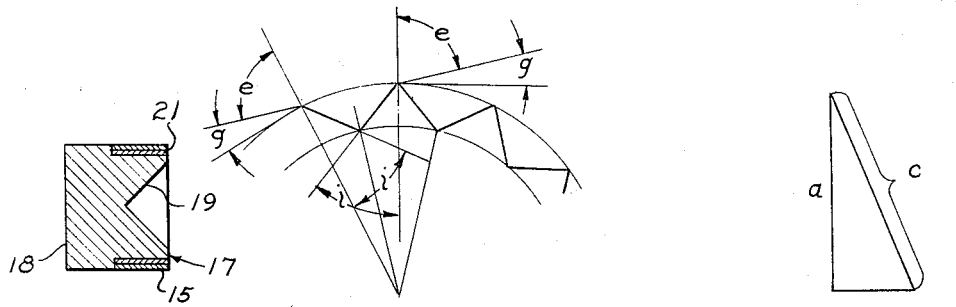
FIG. 1 is a sectional view of a supporting means for the transparent medium during application of indicia thereto.
FIG. 5 is a schematic view of internal light reflections in accordance with Fresnel's law as applied to the present disclosure.
FIG. 6 is a schematic view of the triangulation of the formula.

In the method as practiced by this invention, an annulus 15, the inner circumference of which is capable of being secured frictionally to a cylindrical body 16, is cleaned with a mild solvent such as methyl or denatured alcohol, benzene, or soap and water, and then the inside of the annulus is sprayed with a dull white lacquer. Typical of the white lacquer which may be availed of is a product known in the trade as "Lith-Kem-Ko" which is produced by the Litho Chemical and Supply Co., Inc., located in Lynbrook, New York. Thereafter, upon air drying of the lacquer a light sensitive solvent resisting emulsion is sprayed over the lacquered surface.

The type of lacquer preferred by applicant is known in the trade as Randolf Products No. 5639 and the generally preferred solvent resisting emulsion is produced by the Litho Chemical and Supply Co., Inc., and known as their "deep etch positive sensitizer."

In order to now apply suitable indicia to the prepared surface of the annulus 15, a strip of plastic 17 of an over-all area that will adapt itself to the inner surface of the annulus is positioned securely within said annulus. The strip 17 has been previously provided with the requisite indicia by a process well-known to those skilled in the art of photography. By referring to FIG. 1, it will be seen that this assembly, comprising the annulus 15 and an indicia bearing strip 17 are placed over a Plexiglas or Lucite jig means 18 provided with a peripheral area adequate to receive the assembly snugly. The jig means 18 has a conical recess 19 into which is projected the light from a suitable light source such as a carbon arc lamp, indicated by arrow 20. Because of the conical depression in the jig means, the light from the carbon arc lamp is transmitted substantially at right angles to the axis thereof through the entire area of the circumferential wall 21, thence through the indicia of the strip 17 to expose the sensitive emulsion provided on the annulus 15.

Subsequently, the indicia bearing strip 17 is removed and the transparent annulus 15 is placed in a suitable composition to develop the indicia thereon, whereupon the annulus is then placed in an etching composition to remove all superfluous material from the inner surface thereof, thus leaving only the numerals or other indicia thereon. The material used for developing the indicia after exposure is also readily obtainable from commercial sources, and may include, for example, another product of the Litho Chemical and Supply Co., Inc., known as "deep etch developer."

Figure 2:
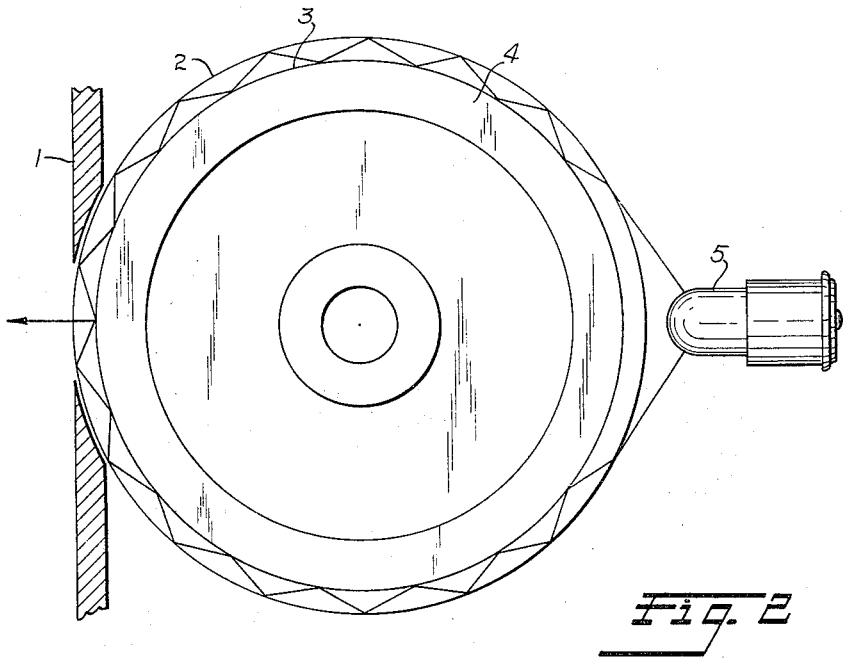
FIG. 2 is a side elevational view of a counter-wheel with the transparent medium showing the passage of light rays and the mask being shown in section.
Figure 3:
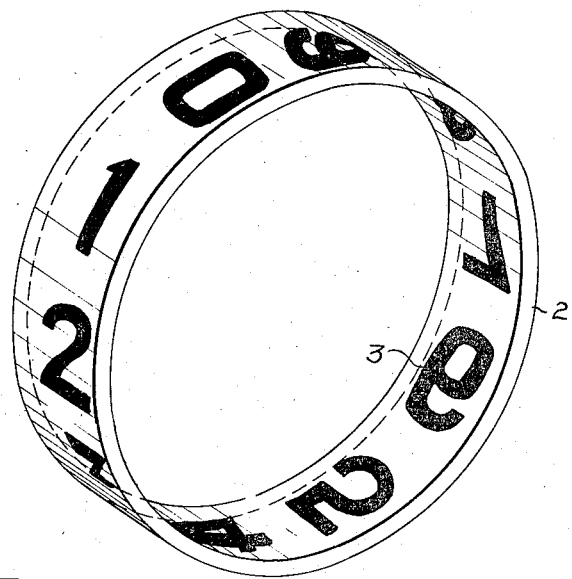
FIG. 3 is a perspective view of the transparent medium showing the indicia applied thereto.

With reference to FIG. 2, there is shown a counter-wheel 16 provided with the transparent ring or annulus 15 and an axial aperture provided for a purpose that will become apparent as the description progresses. This annulus may be made of any transparent material such as plastic, glass or other appropriate available material. The counter wheel 16 is usually constructed of opaque material such as metal, nylon, etc., and is of a standard manufacture readily purchasable on the open market.

The mask 25 provided with a suitable aperture 26 conforming to the periphery of the counter-wheel and the transparent medium 15, but spaced therefrom a predetermined distance to prevent contact, forms the front viewing wall of a suitable receptacle (not shown), in which the counter-wheels may be positioned. It is to be understood that the light source 27 is also positioned within the receptacle adjacent to a suitable reflector 28 and correlated relative to the counter-wheel and its transparent medium in such a way that it makes almost critical angles of incidence with the walls of the cylinder on internal reflection thus making the indicia indicated generally at 29 viewable in the window in the mask, as clearly shown in this figure.

In FIG. 2, the transparent annulus 15 is shown in perspective with the indicia applied to its innermost surface. It is to be understood that the annulus 15 may be of any predetermined size, its function not being impeded by average thickness, width and diameter. However, the annulus must be of a size to conform snugly to the periphery of the counter-wheel or other surface to which it is applied.

Figure 4:
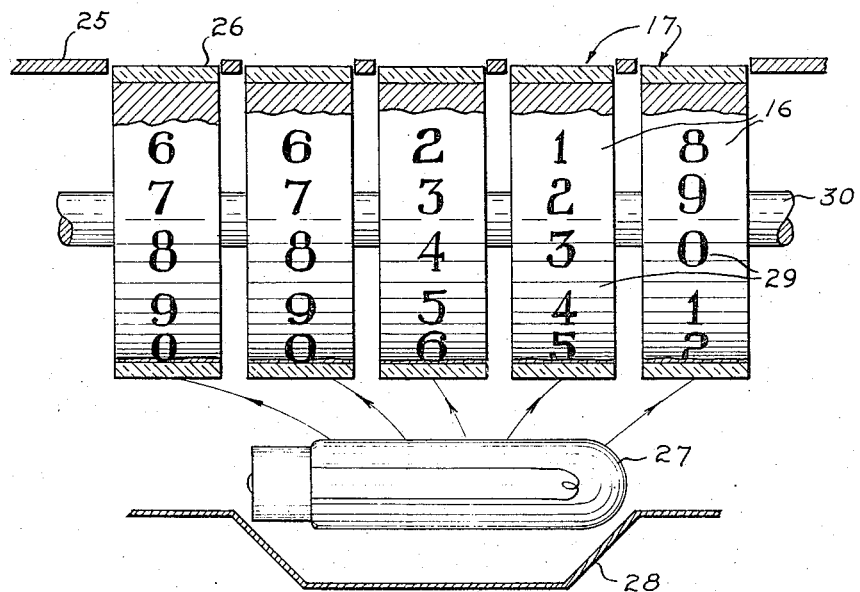
FIG. 4 is a partial section and elevational view of a series of axially disposed drums shown in section with the lighting medium shown in elevation.

Whereas, FIG. 1 merely shows one drum or wheel 16 provided with an annulus 15, which is also provided with indicia 21, viewable as explained; FIG. 4 shows a series of wheels, in section, supported on a central shaft 30 for rotation relative to each other and to the shaft per se. To those skilled in this art it will be apparent that it will be essential to an accurate reading or the coordinating of intelligence to be transmitted by the seriatim display that suitable means be provided for indexing each of the counters 16 on the shaft 30 relative to an adjacent one so that sequential operation thereof is provided. As referred to hereinbefore, in this improved concept light enters the outer walls of the transparent annulus in such a way that it makes critical angles of incidence with the walls of the annulus on internal reflection. Those who are acquainted with optics and more particularly with Fresnel's theory or laws of reflection for light in the incident plane will be interested in FIG. 5 which shows the path of a typical light beam when transmitted by the light source 27. It is to be noted in this figure that reflection at the inner surface adjacent to the periphery of the drum occurs at a higher angle of incidence than at the outer surface of the transparent medium.

Then, according to the theory of Fresnel's law of reflection for light in the incident plane, (1) $\sin i = n \sin e$ (2) $\xi_p =$ wave amplitude attenuation for light polarized in the plane of incidence (3) $\xi_p = \left[1 - \frac{\sin^2(e-i)}{\sin^2(e+i)}\right]^{1/2} \left[\frac{\sin(i-e)}{\sin(i+e)}\right]^m$ for $m$ reflections (4) $\xi_p = \frac{[\sin^2(e+i) - \sin^2(e-i)]^{1/2}}{\sin(e+i)} \left[\frac{\sin(i-e)}{\sin(i+e)}\right]^m$ (5) $\xi_p = \frac{\sqrt{2 \sin e \cos e - \sin i \cos i}}{\sin e \cos i + \cos e \sin i} \left[\frac{\sin i \cos e - \cos i \sin e}{\sin i \cos e + \cos i \sin e}\right]^m$ Then for small angles $g$ as shown in FIG. 5 the following relationships very nearly hold:

(6) $\sin e = \cos g = 1$
(7) $\cos e = \sin g = g$
(8) $\sin i = n \sin e = n$
(9) $\cos i = \sqrt{1-n^2} = p$

(10) $\xi_p = \frac{2\sqrt{gnp}}{p+ng} \left[\frac{ng-p}{ng+p}\right]^m = \frac{2\sqrt{gnp}(ng-p)^m}{(p+ng)^{m+1}}$ Then for extremum with respect to $g$

(11) $\frac{\alpha}{dg} \xi_p = \{(p+ng)^{m+1}[2\sqrt{gnp}\, m(ng-p)^{m-1}n -$ $(ng-p)^m(gnp)^{-1/2}np] -$ $2\sqrt{gnp}(ng-p)^m(m+1)(p+ng)^m n\}(p+ng)^{-2m-2} = 0$ Then referring to the value of $g$ giving extremum value of attenuation as $g_m$

(12) $3n^2 g^2 m - 2np(2m+1)g_m - p^2 = 0$

Whence

(13) $g_m = \frac{2np(2m+1) \pm 2np\sqrt{(2m+1)^2 - 3}}{6n^2}$

(14) $g_m = \frac{p}{3n}[2m+1 \pm \sqrt{(2m+1)^2 - 3}]$

(15) $g_m = \frac{\sqrt{1-n^2}}{3n}[2m+1* - \sqrt{(2m+1)^2 - 3}]$

*Substitution in (10) will show that it is the minus before the square root in (14) that gives maximum efficiency.

This may be further simplified by letting the bracketed term equal segment $d$ in FIG. 6, the difference between leg $a$ and hypotenuse $c$ of a right triangle $abc$ defined as follows:

(16) $2m+1 = c$
(17) $\sqrt{3} = b$

Then

(18) $d = 2M+1 - \sqrt{(2M+1)^2 - 3} = c - \sqrt{c^2 - b^2}$
(19) $2cd - d^2 = b^2 - c^2$ Then neglecting $d^2$ which will be small to a second order when the number of reflection is large

(20) $d = b^2/2c$

Then

(21) $g_m = \frac{\sqrt{1-n^2}}{2n(m+1)}$

Figure 7:
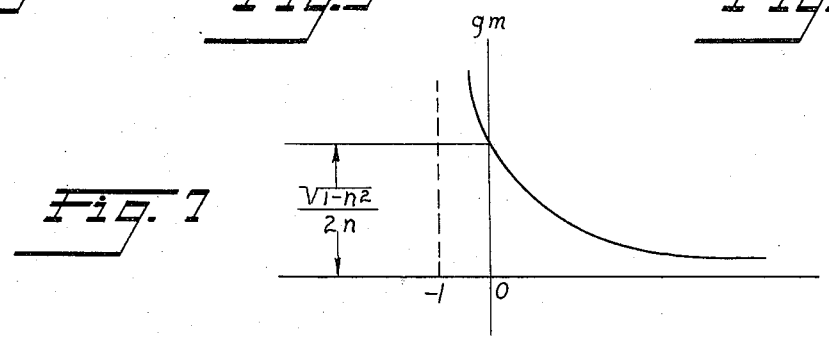
FIG. 7 is another schematic showing, this relating to a hyperbolical curve of the internal reflections.

Indicating that $g_m$ varies with the number of reflections $m$ as shown in FIG. 7.

The left hand portion of the curve shown in FIG. 7 is not valid due to approximations in the derivation contingent on $m$ being large. This does not detract from the results since it is the right hand portion that applies in practical configurations.

Equation 21 gives the angle $g_m$ for most efficient light transmission for a given number of internal reflections $m$.

Of equal importance is the choice of $m$ such that the light path from the light source shall reach the display spot on the counter drum. Values of $g_m$ and $m$ satisfying this condition can be determined by iteration.

A value for $g_m$ may be assumed and the light path determined by geometric construction with the aid of Equation 1. By counting the number of reflections required to reach the display a corrected value of $m$ can be used in (21) to obtain a more correct value of $g_m$.

Since for the relatively large number of reflections $g_m$ must be small the first geometric construction may use $g_m = 0$ whereupon the iteration should converge very rapidly.

The result of the iteration will in general give a fractional value of $m$ whereas obviously an actual optimum ray must experience an integral number of reflections. The equation shown at (10) should be solved for the integral values nearest (one above and one below) the iterated fractional value of $m$ and that giving the greatest efficiency chosen.

Accordingly, let $g_d$ be the angle resulting from this process. Then $g_d$ may still not be the most efficient light path. It is conceivable that for a *smaller* value of $g$ with a correspondingly smaller number of reflections $m$ the smaller number of reflection losses may more than compensate for the angle $g$ being less than optimum.

It is not conceivable, however, that a path with higher efficiency than for $g_d$ should be found having a value for $g$ *greater* than $g_d$ since for all such rays not only would the efficiency for its number of reflections be less than optimum but the number of such reflections and therefore reflection losses would be greater.

It may therefore be said that the optimum light ray enters the high refraction medium at an angle $g$ not greater than $g_d$.

Since $g_d$ is a small angle for the numerous internal reflections encountered in a practical application, this statement adequately defines the phenomenon by which the counter display receives its light.

Although but one embodiment of the invention has been depicted and described, it will be apparent that this embodiment is illustrative in nature and that a number of modifications in the apparatus and variations in its end use may be effected without departing from the spirit or scope of the invention as defined in the appended claim.

What I claim is:

The method of applying indicia to the inner surface of a cylindrical transparent sleeve by means of a negative comprising the steps of:

(a) cleaning the sleeve with a mild solvent;
(b) coating the inner surface thereof with a dull white lacquer;
(c) drying the lacquer and then applying a light sensitive resist emulsion which is hardenable upon application of light thereto;
(d) positioning a photographic negative having indicia applied thereto over a transparent supporting jig means provided with a conical recess with the coated surface of said photographic negative being arranged within the sleeve and in contact with the emulsion;
(e) exposing the emulsion through the photographic negative by angular transmission of light rays from a light source projected through the conical recess in said jig means to harden the emulsion in the areas exposed to said light source;
(f) subjecting the cylindrical transparent sleeve to which the indicia from said negative has been transferred to a developer to remove the unexposed emulsion; and
(g) etching the lacquer to remove the lacquer not protected by the light hardened sensitive resist.

References Cited by the Examiner

UNITED STATES PATENTS

| | | | |
|---|---|---|---|
| 2,446,915 | 8/1948 | Filmer | 96—35 |
| 2,491,386 | 12/1949 | Miller et al. | 96—46 |
| 2,537,329 | 1/1951 | Campbell | 96—46 |
| 2,643,598 | 6/1953 | Carroll | 96—46 |
| 3,069,265 | 12/1962 | Loeber | 96—35 |

NORMAN G. TORCHIN, *Primary Examiner.*

A. D. RICCI, *Assistant Examiner.*